W. H. Ward,
Gear Wheel.

No. 103,398.          Patented May 24, 1870.

Witnesses
Geo. H. Pearson
Geo. R. Gray

William H. Ward
By his Attorneys
Hofferman Johnson

United States Patent Office.

WILLIAM H. WARD, OF AUBURN, NEW YORK.

Letters Patent No. 103,398, dated May 24, 1870.

IMPROVED GEAR-WHEEL.

The Schedule referred to in these Letters Patent and making part of the same.

To all whom it may concern:

Be it known that I, WILLIAM HENRY WARD, of Auburn, in the county of Cayuga and State of New York, have invented certain new and useful Improvements in the Construction of Gear-Wheels; and I do hereby declare that the following is a full, clear, and exact description thereof, reference being had to the accompanying drawings of the same, which make part of this specification, and in which—

My invention relates to toothed gear-wheels, and consists in interrupting the continuity of the fixed seat, so as to form recesses for the reception of projections from the toothed inclosing rim, whereby the latter may be clamped by set-screws arranged within the face of the wheel, so as to bear upon the inner side of the rim, out of the way and free from danger of being broken off.

Also, in the combination and arrangement of the several parts constituting an adjustable gear-wheel.

In the accompanying drawings—

The hub A and the arms B of the wheel may be of any desirable pattern or construction. The arms and hub are not, as heretofore, cast with the rim of the wheel, but are separate and distinct from it, and made with (or without) a rim, C, that encircles the extremities of the arms, and which constitutes a seat for the outer toothed rim. The surface of this seat may or may not be equal to the width of the cogged rim, and its continuity is interrupted at its junction with the arms, so as to form recesses a of such size and in such manner as to admit of the insertion of screw-bolts b, or their equivalents, through each side of said recessed portion of the rim, so that their points of bearing will approach each other from each side of the arms B and at an angle with the arms. The part thus constructed constitutes the fixed member of the wheel, and is secured or keyed in the usual manner to the revolving shaft D.

Figure 1:
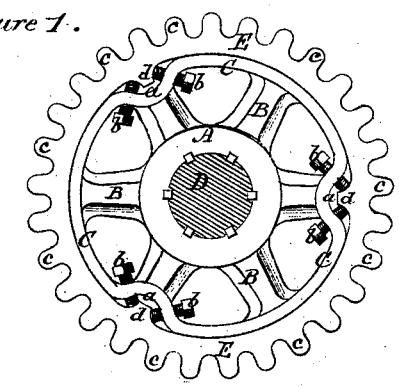
Figure 1 represents an elevation of the side of a gear or cogged wheel embracing my invention.
Figure 2:
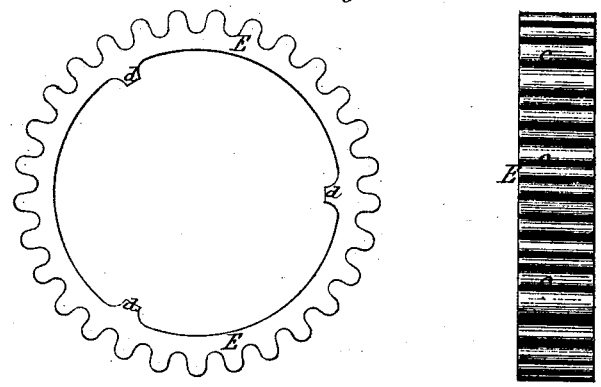
Figure 2 represents an elevation of the side and edge of the adjustable toothed or cogged rim detached from the hub and arms.
Figure 3:
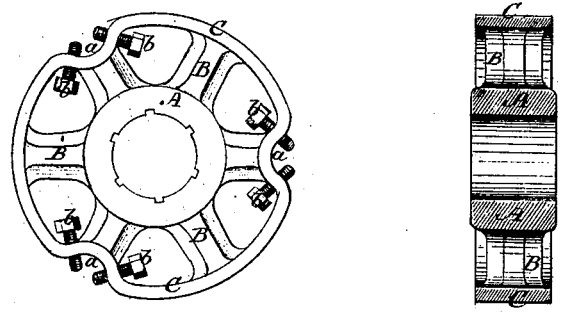
Figure 3 represents the hub and arms in elevation and section, detached from the toothed or cogged rim.

The cogged toothed rim E constitutes the adjustable member of the wheel, and its inner concentric surface is of a diameter sufficient to allow it to be properly fitted upon the web or seat C of the fixed part of the wheel, as shown in fig. 1. The outside of this rim is constructed with cogs or teeth c in the usual manner, while the inner side has a suitable number of projections, d, of such form and size as to extend into each recess and between the converging points of the screws, in such manner that the latter will bear against the opposite sides of the projections d, and leave sufficient space between their bearing points and the sides of the recess in the seat for the proper adjustment of the cogged rim.

The number of recesses in the fixed rim C must be equal to the number of projections d of the adjustable rim E, and the space within the recesses a must be such as to admit of any amount of adjustment necessary for the toothed rim E, equal to the greatest wear of the teeth.

The adjustable rim and the interior fixed part are held together by the binding hold or grip of the adjusting screws, which, it will be seen, pass through the recessed portion of the fixed seat C, and bear upon and against the opposite sides of the projections d of the adjustable rim E, so as to bite and clamp the said projections between them, while the angles of these set screws b, or their substitutes, with reference to the axis of the wheel, are such as that one will bear hard obliquely against one side of the projection d of the toothed rim E, and the other will bear with like force from an oppositely oblique direction against the other side of the said projection d, and thus the two parts are locked as firmly together as though they were made in one and the same wheel. While the screws (or keys) b thus lock the two parts of the wheel together, they also constitute the means for adjusting the toothed rim E upon the seat C of the fixed part, either to the right or to the left, according to the direction the wheel is revolving, and this is done by unscrewing, and thus slackening the set screws in the direction required, and tightening or screwing up those on the opposite side of the recesses, and, as the part to which the said set-screws are secured is fixed upon its shaft D, it will be seen that the rim E must move either to the right or left upon its fixed seat C, and thus effect the required adjustment to compensate for the wear of the work sides of the teeth and the wheels adjusted, causing the rotary dies, &c., to revolve in perfect register, so that, whenever motion is imparted to one shaft or wheel, the adjacent wheels into which it matches must respond to it with rigid firmness and exactness, whereby a mill provided with these adjustable gear-wheels can produce articles heretofore considered impossible to roll correctly, by reason of the wear and looseness of the teeth of the gear-wheels, because the slightest starting and stopping of the driving-wheel, without instantly imparting such motion to the other wheels, causes the whole to rotate out of order; but, with these adjustable wheels, all must move with it in exact unison, and without the least looseness or jerking motion whatever, if properly adjusted.

In order to cut off any back-lash or worm motion of the gearing, two of these adjustable wheels are secured on the same shaft, and, by a simple counter adjustment of one of them, whatever lost motion, (if any,) that may exist can be easily taken up by this counter adjustment of the other wheel.

I do not confine myself to the exclusive use of set-screws, but consider myself at liberty to substitute keys, or their equivalent, if found better in practice, or it may be necessary to attach what is known in mechanics as "jam-nuts," to retain the set-screws firmly in position.

It is obvious that this adjustable gear-wheel is applicable to any kind of rolling or other mills that use rotary stamping and compressing-dies, where great exactness of motion is required, and it may be used in connection with ordinary intermediate gearing in various ways without departing from the spirit of my invention.

Having described my invention,
I claim—

1. The seat C of the fixed part of the wheel, having its continuity interrupted, so as to form recesses $a$, in combination with the toothed inclosing rim E, having projections $d$, for fitting into the recesses, substantially as before described.

2. The combination of the fixed hub A, fixed recessed concentric seat C, and adjusting-screws $b$, or their equivalent, with the toothed adjustable inclosing rim E, constructed, arranged, and operating substantially as described.

W. H. WARD.

Witnesses:
L. A. WARD,
G. HOLLAND.